United States Patent
Liu et al.

(10) Patent No.: US 12,282,780 B2
(45) Date of Patent: Apr. 22, 2025

(54) BOOT TIME REDUCTION FOR AN INFORMATION HANDLING SYSTEM WITH A DATA PROCESSING UNIT

(71) Applicant: DELL PRODUCTS L.P., Round Rock, TX (US)

(72) Inventors: Wei G. Liu, Austin, TX (US); Michael D. Christensen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 18/178,795

(22) Filed: Mar. 6, 2023

(65) Prior Publication Data
US 2024/0303086 A1 Sep. 12, 2024

(51) Int. Cl.
G06F 9/4401 (2018.01)
(52) U.S. Cl.
CPC .................. G06F 9/4406 (2013.01)
(58) Field of Classification Search
CPC ........... G06F 9/4406; G06F 2213/0024; G06F 2213/0026; G06F 9/4411
See application file for complete search history.

(56) References Cited

U.S. PATENT DOCUMENTS

| | | | |
|---|---|---|---|
| 10,445,279 B1* | 10/2019 | Itkin | G06F 13/4063 |
| 2007/0186088 A1 | 8/2007 | Khatri et al. | |
| 2018/0276173 A1* | 9/2018 | Lockwood | H04L 45/586 |
| 2021/0263875 A1* | 8/2021 | Lin | G06F 9/4411 |
| 2022/0027165 A1* | 1/2022 | Juan | G06F 21/572 |
| 2023/0004508 A1 | 1/2023 | Liu et al. | |
| 2023/0028430 A1 | 1/2023 | Iyer et al. | |

* cited by examiner

Primary Examiner — Jaweed A Abbaszadeh
Assistant Examiner — Hyun Soo Kim
(74) Attorney, Agent, or Firm — Larson Newman, LLP (57) ABSTRACT

An information handling system collects system configuration information during a boot process, and builds a bifurcation table for root ports of the information handling system. The system also initiates a bifurcation of the root ports in parallel to loading an operating system of the data processing unit, and disables one of the root ports that is associated with the data processing unit. In response to determining that the operating system of the data processing unit has finished loading, the system enables the root port associated with the data processing unit. The bifurcation of the root port associated with the data processing unit is performed later when a peripheral component interconnect-express endpoint associated with the data processing unit is ready.

20 Claims, 4 Drawing Sheets

BOOT TIME REDUCTION FOR AN INFORMATION HANDLING SYSTEM WITH A DATA PROCESSING UNIT

FIELD OF THE DISCLOSURE

The present disclosure generally relates to information handling systems, and more particularly relates to boot time reduction of an information handling system with a data processing unit.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system collects system configuration information during a boot process, and builds a bifurcation table for root ports of the information handling system. The system also initiates a bifurcation of the root ports in parallel to loading an operating system of the data processing unit, and disables one of the root ports that is associated with the data processing unit. In response to determining that the operating system of the data processing unit has finished loading, the system enables the root port associated with the data processing unit.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
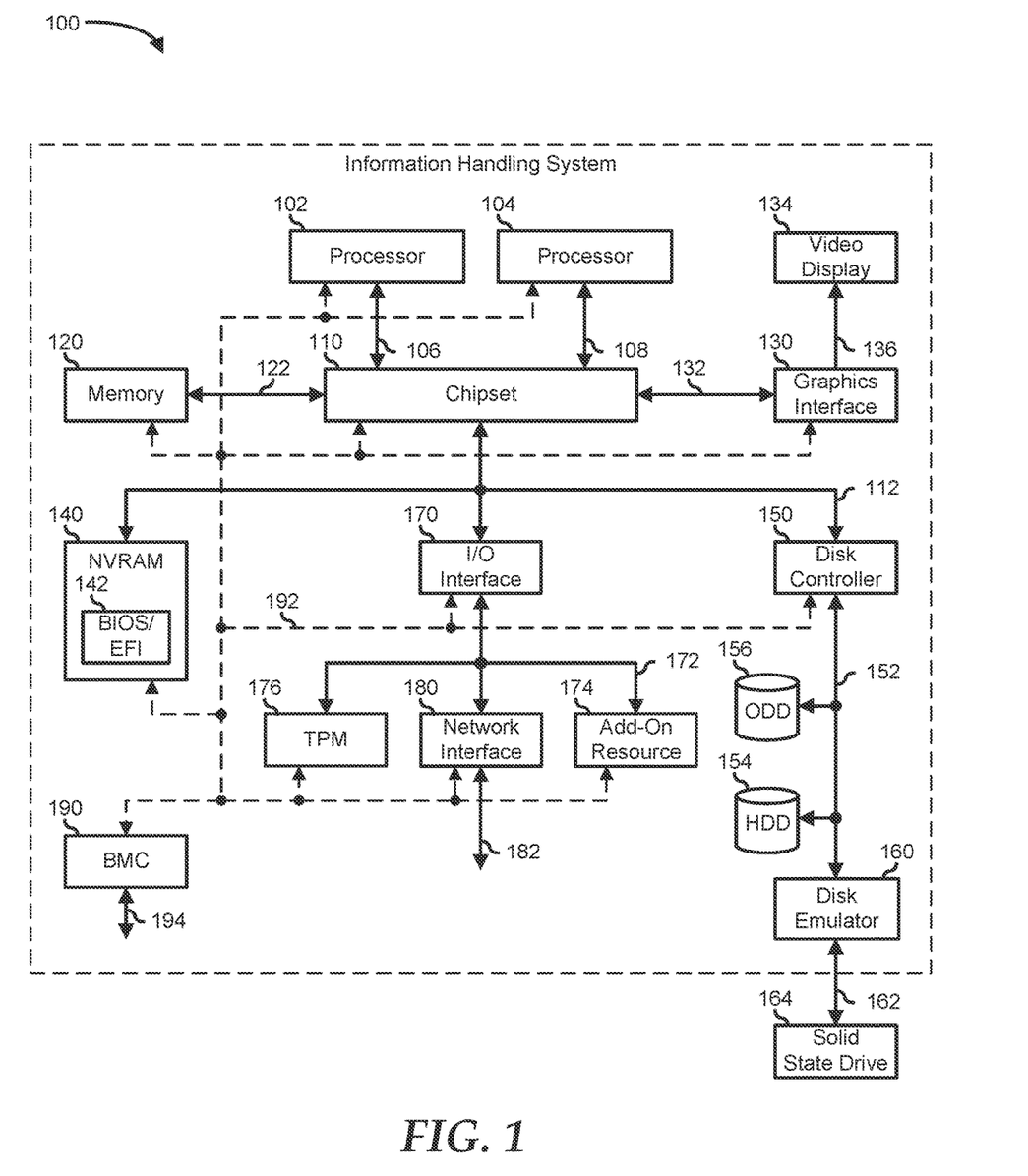
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell R Remote Access Controller (iDRAC).

Management interface 192 represents one or more out-of-band communication interfaces between BMC 190 and the elements of information handling system 100, and can include an I2C bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a RedfishR interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

A data processing unit or a smart network interface card (NIC) typically combines network connectivity with CPU cores independent from a hypervisor or operating system. Currently, there is a requirement for boot synchronization where a server BIOS ensures the data processing unit or the smartNIC has booted before the server starts the host operating system or hypervisor boot process. Accordingly an operating system of the data processing unit, such as ESXio™, should be sufficiently booted before the server BIOS trains and enumerate PCIe devices. This is because once the operating system of the data processing unit has booted, there might be additional PCIe endpoints that should be initialized. The current design is that on every boot before PCIe bifurcation, the BIOS shakes hands with the BMC, such as BMC 190 of FIG. 1, to check for the presence of a data processing unit and waits for a ready state signal from the data processing unit before proceeding with the rest of the boot process.

This may result in a user waiting several minutes for the information handling system to complete the boot process. Because the PCIe bifurcation and training happen early in a power-on self-test, such as during the pre-EFI initialization phase before interconnect verification and memory reference code reset, there is a primitive video display with no keyboard or mouse support. As such, the user may not be able to bypass the wait time decreasing efficiency and overall user experience. To address these and other concerns, the present disclosure provides a system and method for boot time reduction on an information handling system with a data processing unit.

Figure 2:
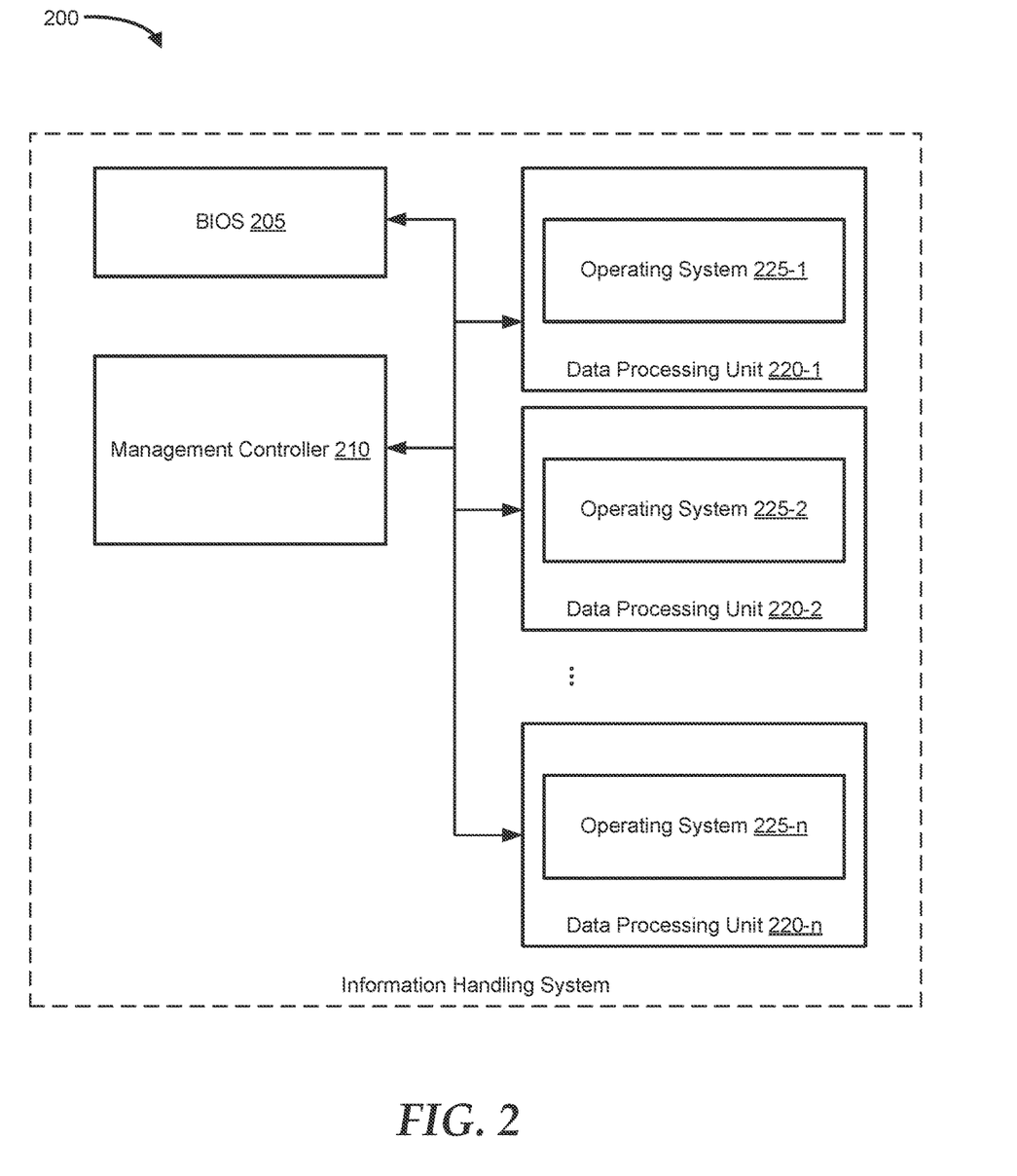
FIG. 2 is a block diagram illustrating an information handling system configured with a system and method for reduction in its boot time, according to an embodiment of the present disclosure.

FIG. 2 shows an information handling system 200 configured with a system and method for reduction in its boot time. Information handling system 200, which is similar to information handling system 100 of FIG. 1, includes a BIOS 205, a management controller 210, and data processing units 220-1 through 220-n. The components of information handling system 200 may be implemented in hardware, software, firmware, or any combination thereof. In addition, the components shown are not drawn to scale, and information handling system 200 may include additional or fewer components. In addition, connections between components may be omitted for descriptive clarity.

Each one of data processing units 220 may be a hardware device executing software that enables the processing unit to receive commands and coordinate the flow of data to one or more processing units. Each one of data processing units 220 may include any number of processing entities that are embedded in the same hardware. Further, each one of data processing units 220 includes an operating system, such as operating systems 225-1 through 225-n respectively. Data processing units 220-1 through 220-n may be programmable specialized electronic circuits and includes a smartNIC, an infrastructure processing unit, a smart graphics processing unit, a field programmable gate array (FPGA), or similar.

Management controller 210, which is similar to BMC 190 of FIG. 1, is a separate processing unit such as a system on a chip for managing various features of information handling system 200. Management controller 210 may include any system, device, or apparatus configured to facilitate management and/or control of information handling system 200. For example, management controller 210 may include a microprocessor, a microcontroller, a digital signal processor, an application-specific integrated circuit (ASIC), an FPGA, an electrically erasable programmable ROM, or similar. In certain embodiments, management controller 210 may include or may be an integral part of a chassis management controller, a BMC, a DRAC, an iDRAC, an enclosure controller, a service processor, or an embedded controller. In these and other embodiments, management controller 210 may also be referred to as an access controller or a life-cycle controller.

BIOS 205, which is similar to BIOS/EFI 142 of FIG. 1, may be a suitable system, apparatus, or device operable to manage resources for information handling system 200. In particular, BIOS 205 may include a set of firmware instructions electronically stored within information handling system 200 that allows information handling system 200 to manage various resources and/or perform specific tasks. For example, information handling system 200 may use BIOS 205 to perform hardware initialization during a pre-boot sequence and/or to provide runtime services for other host services executing in information handling system 200.

BIOS 205 may be configured to determine what devices, such as data processing units, are present in various slots, such as PCIe slots, and what their lane widths should be. During the early stages of the power-on self-test, a root port, such as a PCIe root port may establish a link with the detected device. Handshake signaling during hardware training may detect lane designations to determine whether the attached devices are communicating and the link width in which they trained. Typically, for PCIe devices, such as data processing units 220 the PCIe root port may be able to recognize the device and establish a link between the device and the PCIe root port. The device may report a maximum width and BIOS 205 may set the lane bifurcation to reflect the width. Lane bifurcation, such as a PCIe bifurcation, may include determining how many lines should be assigned to a root port through which each device is connected. Conventionally, the BIOS may refrain from initializing system resources for data processing units until an operating system of the data processing unit, such as ESXio™, has completed a booting process to ensure that each emulated device or endpoint associated with the data processing unit may be enumerated accordingly.

Typically, to reduce boot time, the bifurcation and training of root ports of an information handling system, such as a PCIe bifurcation and training, is performed in the earlier phases of the boot process. For example, the bifurcation and training of the root ports are performed after the boot device selection phase of the boot process. In the present disclosure, the bifurcation and training of certain root ports, such as the root ports associated with data processing units 220 are performed in the later phases of the boot process. Instead, the BIOS 205 may communicate with management controller 210 prior to the boot device selection phase. This allows BIOS 205 to perform certain operations associated with these root ports prior to the boot device selection phase and/or in parallel with other operations which reduces the overall boot time.

Those of ordinary skill in the art will appreciate that the configuration, hardware, and/or software components of information handling system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for the continuity of the description.

Figure 3:
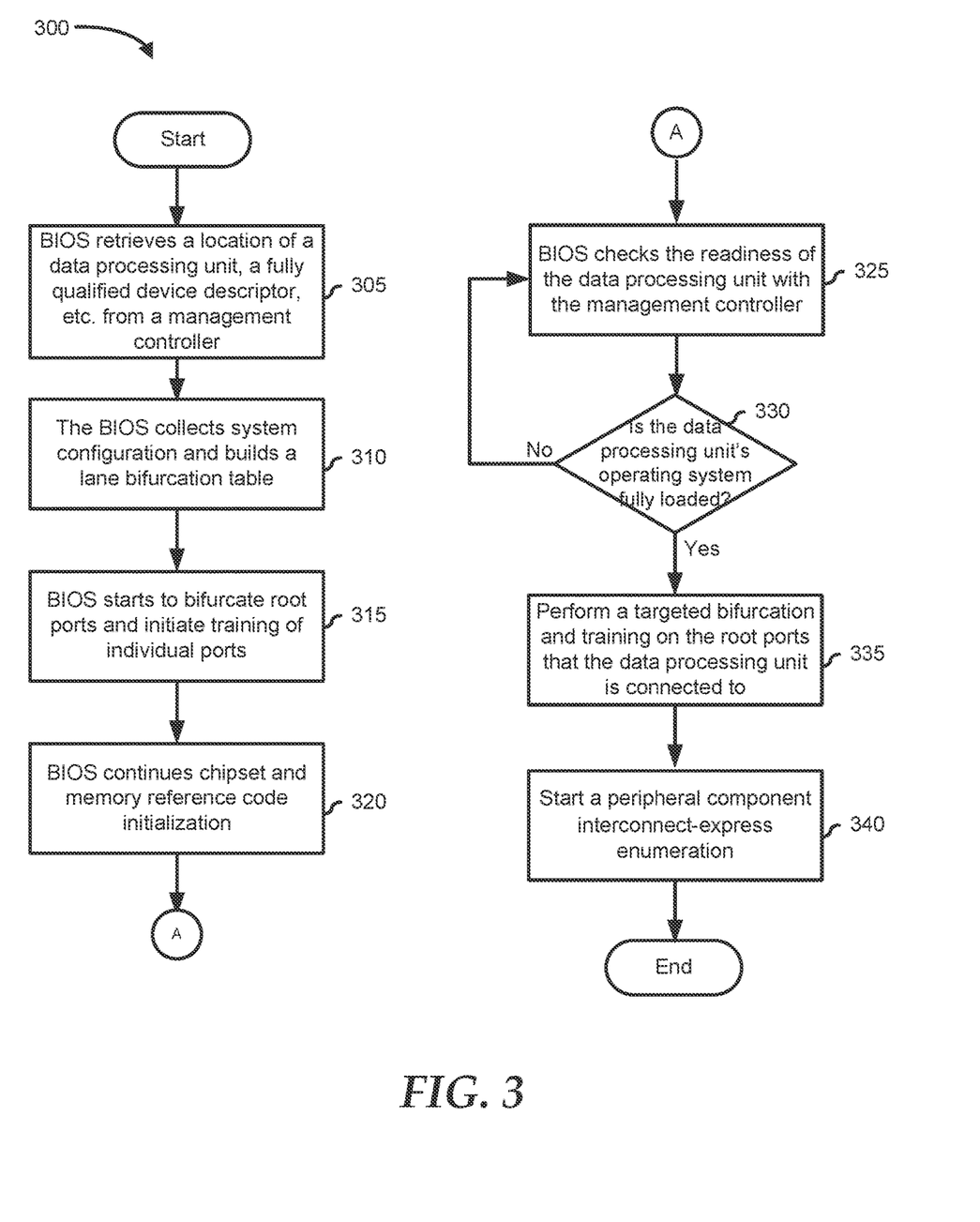
FIG. 3 is a flowchart illustrating a method for boot time reduction for an information handling system with a data processing unit, according to an embodiment of the present disclosure.

FIG. 3 shows a flowchart of a method 300 for boot time reduction of an information handling system with a data processing unit. Method 300 may be performed by one or more components of information handling system 200 of FIG. 2. However, while embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

Method 300 may be performed during the power-on self-test of the information handling system. Method 300 typically starts at block 305 where the BIOS may retrieve information associated with one or more data processing units, such as data processing units 220 of FIG. 2, from a management controller. For example, the BIOS may send a command to the management controller to get a location of the data processing unit, a slot number, a fully qualified device descriptor, etc. The fully qualified device descriptor may be used to help identify a location, a port number, and the like of the data processing unit. The BIOS may also send a request for estimated resource requirements associated with the data processing unit. In response, the BIOS may receive the estimated resource requirements from the management controller.

At block 310, the BIOS may collect system configuration information and build a bifurcation table, such as a PCIe bifurcation table. The bifurcation table may describe the mapping of each system to a bifurcation setting, such as a link width. However, as the operating system of the data processing unit is still not loaded, one or more cells in the bifurcation table that are associated with a slot(s) used by the data processing unit may be left unpopulated. The cell(s) associated with the slots for the data processing units may be left unpopulated until later in the process. This allows the method to proceed to block 315 without waiting for the operating system initialization of the data processing unit. At block 315, the BIOS may start to bifurcate the root ports, such as PCIe root ports, and initiate training of individual ports except for the ports where the data processing units are connected. Bifurcation of the root ports associated with the data processing units may be skipped at this point and performed later in the process when the PCIe endpoints of the data processing units are ready, such as after the initialization of the operating system of the data processing units.

At block 320, the BIOS may continue with the chipset initialization and memory reference code initialization while the operating system of the processing unit(s) is loading. At block 325, the BIOS may check the readiness of the data processing unit with the management controller. At this point, the boot process may enter the boot device selection phase, and the BIOS performs a handshake with the management controller to retrieve the boot status of the data processing unit's operating system as the data processing unit may send a signal to the management controller indicating that the operating system has completed the boot process or in a ready state.

The method proceeds to decision block 330 where the method checks whether the DPU operating system is fully loaded. The BIOS may monitor the status of the data processing unit and wait until the operating system of the data processing unit is fully loaded. If the operating system of the data processing unit is fully loaded, then the "YES" branch is taken, and the method proceeds to block 335. If the operating system of the data processing unit is not fully loaded, then the "NO" branch is taken, and the method proceeds to block 325.

At block 335, the method may perform a targeted bifurcation and training on one or more root ports that each of the data processing units is connected. This allows the utilization of the maximum width of the root port(s). The method proceeds to block 340 where the method may start the PCIe enumeration. At this point, the method may continue with the remainder of the power-on self-test.

Figure 4:
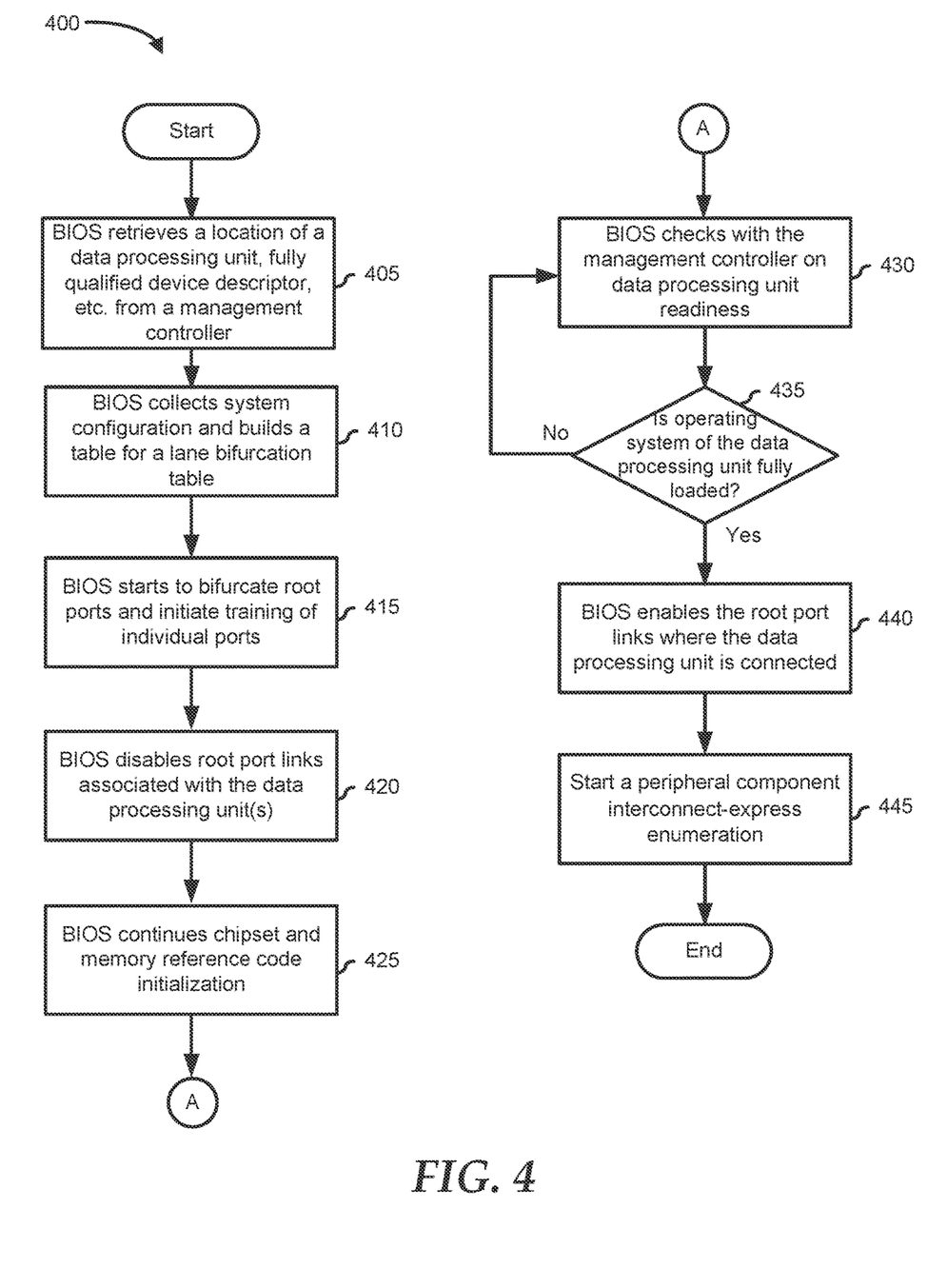
FIG. 4 is a flowchart illustrating a method for boot time reduction for an information handling system, according to an embodiment of the present disclosure.

FIG. 4 shows a flowchart of a method 400 for boot time reduction of an information handling system with a data processing unit. Method 400 may be performed by one or more components of information handling system 200 of FIG. 2. However, while embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

Method 400 may be performed during the power-on self-test process of the information handling system. Method 400 typically starts at block 405 where the BIOS may retrieve information associated with one or more data processing units, such as data processing units 220 of FIG. 2, from the management controller. For example, the BIOS may send a command to the management controller to get a location of the data processing unit, a slot number, a fully qualified device descriptor, etc. The fully qualified device descriptor may be used to help identify the location, port number, and the like of the data processing unit. The method proceeds to block 410.

At block 410, the BIOS collects system configuration information and builds a lane bifurcation table, such as a PCIe bifurcation table. At block 415, the BIOS may start to bifurcate root ports, such as PCIe root ports, and initiate training of the individual ports. At block 420, when the bifurcation is complete, the BIOS may disable the root port links where the data processing units are connected. The method proceeds to block 425 where the BIOS may continue with the chipset initialization and memory reference code initialization in parallel with the loading of the operating system of the data processing unit.

The method proceeds to block 430 where the BIOS may check the readiness of the data processing unit with the management controller. At this point, the boot process enters the boot device selection phase, and the BIOS may perform a handshake with the management controller to retrieve the operating system boot status of the data processing unit. The BIOS may wait until the DPU operating system is fully loaded.

The method proceeds to decision block 435 where the method checks whether the operating system of the data processing unit has finished loading or is fully loaded. At this point, the data processing unit may be in a ready state and send a signal accordingly to the management controller. If the operating system of the data processing unit is fully loaded, then the "YES" branch is taken, and the method proceeds to block 440. If the operating system of the data processing unit is not fully loaded, then the "NO" branch is taken, and the method proceeds to block 430.

At block 440, the PCIe endpoints of the data processing unit are ready to establish a link to the information handling system. The method may enable the root port links where the data processing unit is connected. This may cause link training to occur on the upstream PCIe root ports of the data processing unit. The method proceeds to block 445 where the PCIe enumeration may start. The method may then continue with the remainder of the POST.

Throughout this disclosure, an alphabetic character following a numeral form of a reference number refers to a specific instance of an element and the numerical form of the reference numeral refers to the element generically. Thus, for example, data processing unit "220-1" refers to an instance of a device class, which may be referred to collectively as data processing units "220" and any one of which may be referred to generically as data processing unit "220".

Although FIG. 3, and FIG. 4 show example blocks of method 300 and method 400 in some implementations, method 300 and method 400 may include additional blocks, fewer blocks, different blocks, or differently arranged blocks than those depicted in FIG. 3 and FIG. 4. Those skilled in the art will understand that the principles presented herein may be implemented in any suitably arranged processing system. Additionally, or alternatively, two or more of the blocks of method 300 and method 400 may be performed in parallel. For example, block 325 of method 300 and block 425 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an ASIC, an FPGA, a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    collecting system configuration information, by a processor, during a boot process of an information handling system having a data processing unit;
    building a bifurcation table for root ports of the information handling system and keeping a cell in the bifurcation table unpopulated for one of the root ports that is associated with the data processing unit;
    initiating a bifurcation of the root ports while an operating system of the data processing unit is loading; and
    in response to determining, during a boot device selection phase of the boot process, that the operating system of the data processing unit has finished loading, bifurcating the root ports associated with the data processing unit.

2. The method of claim 1, further comprising in response to the determining that the operating system of the data processing unit has finished loading, training the root ports associated with the data processing unit.

3. The method of claim 1, further comprising retrieving a status of the operating system of the data processing unit from a management controller.

4. The method of claim 3, wherein the retrieving of the status of the operating system of the data processing unit from the management controller is performed during the boot device selection phase of the boot process.

5. The method of claim 1, further comprising retrieving a location and a fully qualified device descriptor of the data processing unit from a management controller.

6. The method of claim 1, further comprising performing a chipset initialization and a memory reference code initialization in parallel with the loading of the operating system of the data processing unit.

7. The method of claim 1, further comprising subsequent to bifurcating and training of the root ports associated with the data processing unit, performing peripheral component interconnect-express enumeration.

8. An information handling system having a data processing unit, the information handling system comprising:
    a processor; and
    a memory storing code that when executed causes the processor to perform operations including:
        collecting system configuration information during a boot process of the information handling system;
        building a bifurcation table for root ports of the information handling system;
        initiating a bifurcation of the root ports in parallel to loading an operating system of the data processing unit;
        disabling one of the root ports that is associated with the data processing unit; and
        in response to determining, during a boot device selection phase of the boot process, that the operating system of the data processing unit has finished loading, enabling the root ports associated with the data processing unit.

9. The information handling system of claim 8, wherein the operations further comprise retrieving status of the operating system of the data processing unit from a management controller.

10. The information handling system of claim 9, wherein the retrieving of the status of the operating system of the data processing unit from the management controller is performed during the boot device selection phase of the boot process.

11. The information handling system of claim 8, wherein the operations further comprise retrieving a location and a fully qualified device descriptor of the data processing unit from a management controller.

12. The information handling system of claim 8, wherein the operations further comprise performing chipset initialization and memory initialization in parallel with the loading of the operating system of the data processing unit.

13. The information handling system of claim 8, wherein the operations further comprise subsequent to the enabling of the root ports associated with the data processing unit, performing peripheral component interconnect-express enumeration.

14. A non-transitory computer-readable medium to store instructions that are executable to perform operations comprising:
    collecting system configuration information during a boot process of an information handling system with a data processing unit;

building a bifurcation table for root ports of the information handling system, wherein keeping a cell in the bifurcation table unpopulated for one of the root ports that is associated with the data processing unit;

initiating a bifurcation of the root ports while an operating system of the data processing unit is loading; and in response to determining, during a boot device selection phase of the boot process, that the operating system of the data processing unit has finished loading, bifurcating the root ports associated with the data processing unit.

15. The non-transitory computer-readable medium of claim 14, wherein the operations further comprise in response to the determining that the operating system of the data processing unit has finished loading, training the root ports associated with the data processing unit.

16. The non-transitory computer-readable medium of claim 14, wherein the operations further comprise retrieving status of the operating system of the data processing unit from a management controller.

17. The non-transitory computer-readable medium of claim 16, wherein the retrieving of the status of the operating system of the data processing unit from the management controller is performed during the boot devices selection phase of the boot process.

18. The non-transitory computer-readable medium of claim 14, wherein the operations further comprise retrieving a location and a fully qualified device descriptor of the data processing unit from a management controller.

19. The non-transitory computer-readable medium of claim 14, wherein the operations further comprise performing chipset initialization and memory initialization in parallel with the loading of the operating system of the data processing unit.

20. The non-transitory computer-readable medium of claim 14, wherein the operations further comprise subsequent to bifurcating and training of the root ports associated with the data processing unit, performing peripheral component interconnect-express enumeration.

\* \* \* \* \*